(12) United States Patent
Park

(10) Patent No.: US 6,870,576 B2
(45) Date of Patent: Mar. 22, 2005

(54) AUTOMATIC BEAM LIMITER CIRCUIT

(75) Inventor: Sung-Uk Park, Yongin (KR)

(73) Assignee: Samsung Electronics Co., Ltd. (KR)

( * ) Notice: Subject to any disclaimer, the term of this patent is extended or adjusted under 35 U.S.C. 154(b) by 610 days.

(21) Appl. No.: 09/996,231

(22) Filed: Nov. 28, 2001

(65) Prior Publication Data

US 2002/0130966 A1 Sep. 19, 2002

(30) Foreign Application Priority Data

Mar. 13, 2001 (KR) ........................................ 2001-12897

(51) Int. Cl.⁷ .............................................. H04N 5/14
(52) U.S. Cl. ...................... 348/673; 348/687; 348/379
(58) Field of Search ................................ 348/381, 382, 348/379, 673, 678, 679, 682, 686, 687, 688; 315/169.1, 169.2, 169.3, 169.4

(56) References Cited

U.S. PATENT DOCUMENTS

| | | | | |
|---|---|---|---|---|
| 3,980,822 | A | | 9/1976 | Suzuki et al. ................. 178/7.5 |
| 4,079,424 | A | | 3/1978 | Serafini ...................... 358/243 |
| 4,573,183 | A | * | 2/1986 | Relihan ...................... 378/108 |
| 4,907,084 | A | * | 3/1990 | Nagafusa .................... 348/691 |
| 5,003,394 | A | * | 3/1991 | Lagoni ....................... 348/673 |
| 5,396,300 | A | * | 3/1995 | Kageyama .................. 348/678 |
| 5,546,134 | A | * | 8/1996 | Lee ............................ 348/673 |
| 6,351,253 | B2 | * | 2/2002 | Kasahara et al. ............. 345/63 |
| 6,433,769 | B1 | * | 8/2002 | Cato .......................... 345/101 |
| 6,650,373 | B2 | * | 11/2003 | Ono et al. ................... 348/673 |
| 6,741,295 | B2 | * | 5/2004 | Nieuwenhuizen et al. .. 348/687 |

FOREIGN PATENT DOCUMENTS

EP           1069766 A2      1/2001

* cited by examiner

Primary Examiner—Michael H. Lee
Assistant Examiner—Trang U. Tran
(74) Attorney, Agent, or Firm—F. Chau & Associates, LLC

(57) ABSTRACT

An automatic beam limiter circuit (ABL circuit) calculating an average of a video signal at least a portion of the video signal is provided. After a converter circuit converts an analog signal, which is generated from the video signal, to a digital signal, a horizontal and a vertical average circuits calculate a horizontal and vertical averages of the digital signal at least a portion of the digital signal. The portion of the digital signal is a scanned line of the digital signal on a CRT. A comparison circuit compares a first calculation value calculated between a reference value and the vertical average with a second calculation value calculated between the reference value and the horizontal average, and outputs a first comparison signal and a second comparison signal based on the comparison results. A gain control circuit produces a gain control signal for adjusting the brightness/contrast in response to the first comparison and second comparison signals. Advantageously, the automatic beam limiter circuit is capable of efficiently preventing a frame delay in controlling the brightness/contrast of the video signal and the rapid increase of beam current when a black field is rapidly changed into a white field.

10 Claims, 4 Drawing Sheets

AUTOMATIC BEAM LIMITER CIRCUIT

BACKGROUND OF THE INVENTION

1. Field of the Invention

The present invention relates to a television receiver or a monitor, and more particularly, to an automatic beam limiter circuit capable of preventing the rapid increase of beam current when a black field is rapidly changed into a white field.

2. Description of Related Art

Cathode ray tubes (CRTs) are commonly used in television sets. In a CRT, beam current flows from an anode to a cathode and increases in proportion to the amplitude of video signals input to the cathode. When beam current flowing through a CRT exceeds the rated current of peripheral circuits such as a fly back transformer (FBT) and a CRT driver, in any field, the peripheral circuits can be damaged or image displayed on the CRT distorted. Thus, the CRT should maintain an appropriate brightness level in response to a video signal input. In most television receivers, an automatic beam limiter (ABL) circuit or an automatic brightness limiter circuit is used to control the amount of beam current.

The ABL circuit senses beam current flowing in fields and automatically reduces brightness and/or contrast when the amount of sensed beam current exceeds a predetermined limit. As such, the ABL circuit protects a CRT by automatically reducing the amplitude of video signals input to the cathode of the CRT and prevents beam current overflow.

FIG. 1 is a block diagram of a television receiver including a conventional ABL circuit. Referring to FIG. 1, the television receiver includes a brightness/contrast control circuit 2, an RGB matrix 4, a digital-analog converter (DAC) 6, a CRT driver 8, a CRT 10, a fly back transformer (FBT) 12, a beam current detection circuit 14, and an ABL circuit 20.

The ABL circuit 20 includes an analog-digital converter (ADC) 22, a field average circuit 24, a calculator 26, and a gain control circuit 28.

The brightness/contrast control circuit 2 controls the brightness and/or contrast of a video signal IN input therein in response to a gain control signal Gout output from the gain control circuit 28, and outputs the controlled video signal IN, as a brightness signal (Y signal) and a chroma signal (C signal) to the RGB matrix 4.

The RGB matrix 4 outputs red, green, and blue signals in response to the output signals (brightness and chroma signals) of the brightness/contrast control circuit 2. The DAC 6 converts digital signals output from the RGB matrix 4 into analog signals and outputs the analog signals to the CRT driver 8.

The CRT driver 8 amplifies the analog signals output from the DAC 6 and inputs the analog signals into the cathode of the CRT 10. The CRT 10 is a vacuum tube for displaying the video signal IN on a screen of a television.

The FBT 12 outputs beam current ib to the anode of the CRT 10 in proportion to the level of the video signal IN input to the cathode of the CRT 10 and generates a high voltage of several kilovolts or greater required in the anode of the CRT 10.

The current detection circuit 14 detects the beam current ib output from a power supply voltage VCC to the cathode of the CRT 10 through resistors R1 and R2 and the FBT 12 and outputs a detection signal corresponding to the detected beam current ib to the ADC 22. A capacitor C removes switching noise from the FBT 12.

The ADC 22 of the ABL 20 converts an analog signal at a node VA to an N-bit digital signal and outputs the N-bit digital signal to the field average circuit 24. The field average circuit 24 calculates the average of the output signal of the ADC for a predetermined frame or a predetermined field in response to a synchronous signal Vsync and outputs the average to the calculator 26.

The calculator 26 can be used as an adder and a subtractor. The calculator 26 calculates the difference between a reference value REF and the output value of the field average circuit 24, that is, an average beam current Fave and outputs the calculated signal to the gain control signal 28.

The gain control circuit 28 outputs the gain control signal Gout, which controls the brightness and contrast of the video signal input to the CRT 10, to the brightness/contrast control circuit 2 in response to the output signal of the calculator 26. As a result, if the brightness of a CRT screen increases, the beam current ib increases. Then, the ABL 20 reduces the brightness and contrast of the video signal IN input to the CRT 10 to decrease the level of the video signal IN of the CRT 10.

However, because the conventional ABL 20 takes the average of the beam current ib for every field and adjusts the beam current ib for field, as illustrated in FIG. 5(b), at least one field is delayed.

As a result, when a black field is rapidly converted into a white field as shown in FIG. 5(a), an excessive amount of beam current ib flows in one field as illustrated in FIG. 5(b). Therefore, when averaging the beam current ib for every field, as described in the conventional ABL 20, the CRT 10 and its peripheral circuits receive a spiked current during one field period, and noise occurs at the FBT 12.

SUMMARY OF THE INVENTION

To solve the above problems, it is an object of the present invention to provide an Automatic Beam Limiter (ABL) circuit which is capable of effectively preventing beam current from being rapidly increased when the brightness of a screen is rapidly changed.

It is another object of the present invention to provide a television receiver capable of control the brightness/contrast of a video signal input to a CRT without field delay.

According to a preferred embodiment of the present invention, there is provided an ABL circuit including a conversion circuit, a horizontal average circuit, a vertical average circuit, a comparison circuit, and a gain control circuit.

The conversion circuit converts an analog signal, which is generated from the video signal, to a digital signal. The horizontal average circuit calculates a horizontal average of the digital signal at least a portion of the digital signal, and a vertical average circuit calculates a vertical average of the horizontal average. A comparison circuit compares a first calculation value calculated between a reference value and the vertical average of the vertical average circuit with a second calculation value calculated between the reference value and the horizontal average of the horizontal average circuit, and outputs a first comparison signal and a second comparison signal based on the comparison results. And, a gain control circuit produces a gain control signal in response to the first comparison and second comparison signals for adjusting the brightness/contrast of the video signal input to the CRT. The portion of digital signal is preferably a scanned line of the digital signal on the CRT.

The automatic beam limiter circuit may further comprise an inversion circuit for inverting the horizontal average of the horizontal average circuit.

In the comparison circuit, the first calculation value is calculated by subtracting the vertical average from the reference value, the second calculation value is calculated by subtracting the reference value from the horizontal average. And, the first comparison signal is the first calculated value. The second comparison signal is the second calculated value when the first calculated value is smaller than the second calculated value, and the second comparison signal is zero (0) when the first calculated value is larger than the second calculated value.

According to another preferred embodiment of the present invention, a television receiver including an automatic beam limiter circuit for controlling a brightness/contrast of a video signal input to a cathode ray tube (CRT) is provided.

The automatic beam limiter circuit comprises a conversion circuit for converting an analog signal, which is generated from the video signal, to a digital signal; a average calculator for calculating a horizontal average and a vertical average of the digital signal at least a portion of the digital signal; a comparison circuit for comparing a first calculation value calculated between a reference value and the vertical average with a second calculation value calculated between the reference value and the horizontal average, and outputting a first comparison signal and a second comparison signal, wherein the first comparison signal is the first calculated value, and the second comparison signal is zero (0) or the second calculated value according to the comparison results; and a gain control circuit for generating a gain control signal in response to the first comparison and second comparison signals for adjusting the brightness/contrast of the video signal input to the CRT. The portion of the digital signal is a scanned line of the digital signal on the CRT.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
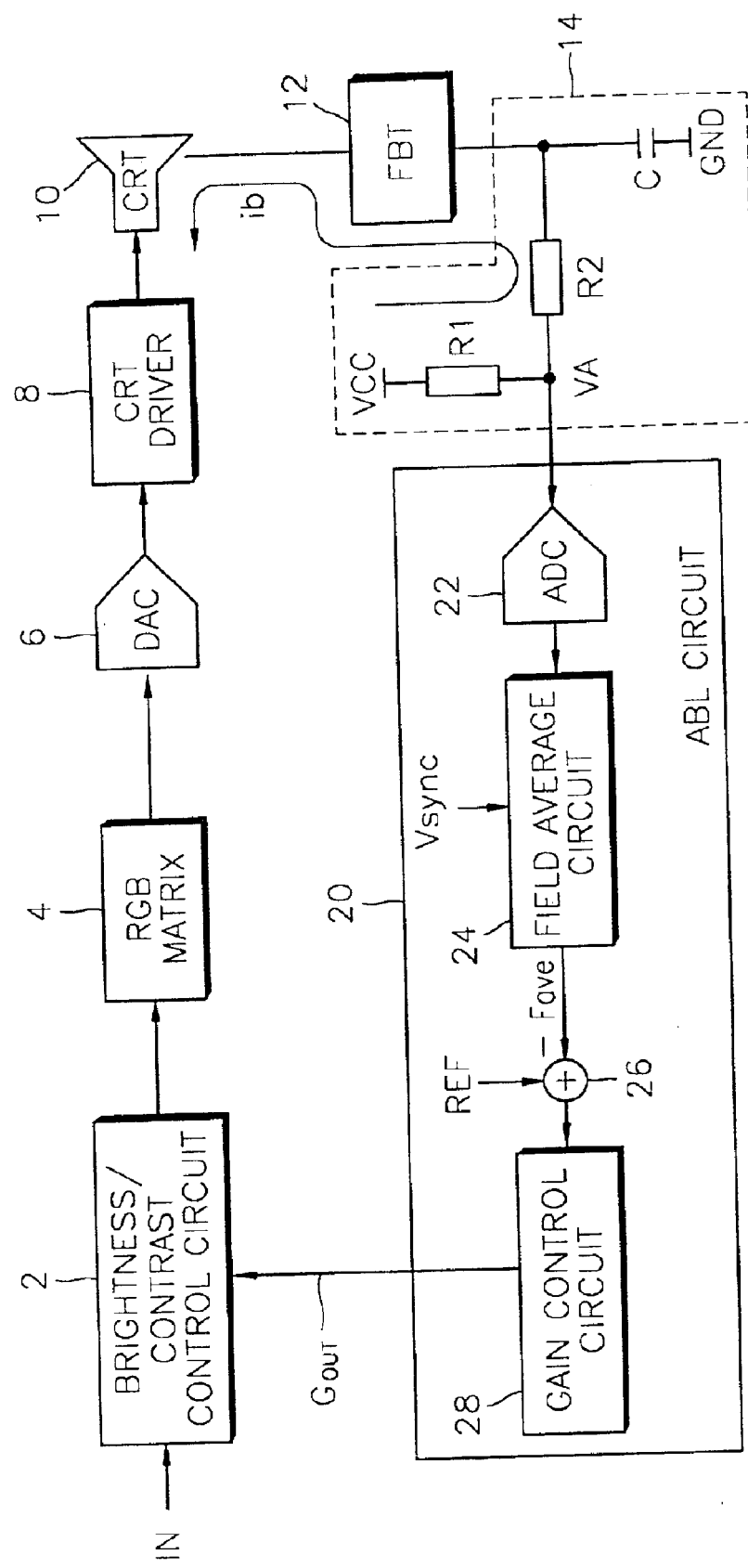
FIG. 1 is a block diagram of a television receiver including a conventional automatic beam limiter (ABL circuit) circuit.

The present invention now will be described more filly with reference to the accompanying drawings, in which a preferred embodiment of the invention is shown. The same reference numerals in different drawings represent the same element, and thus their description will be omitted.

Figure 2:
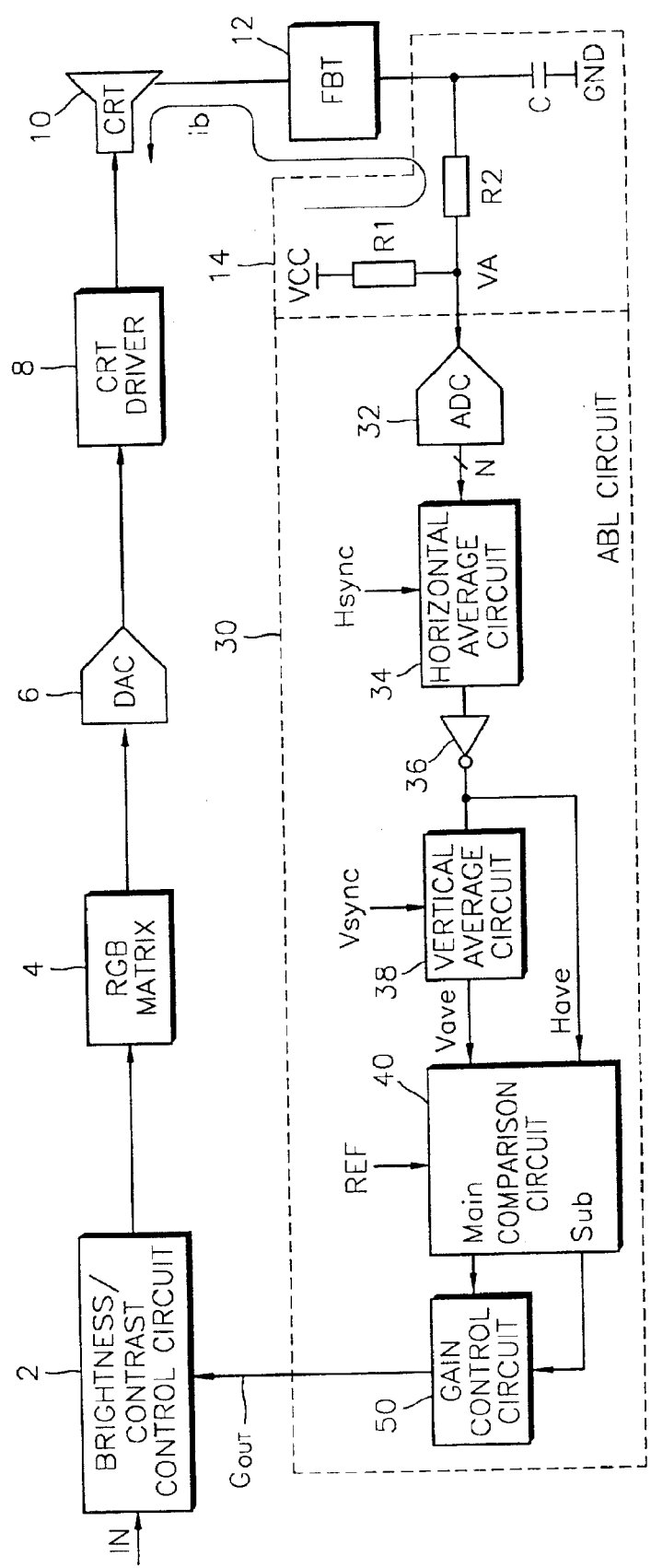
FIG. 2 is a block diagram of a television receiver including an ABL circuit according to a preferred embodiment of the present invention.

Referring to FIG. 2, CRT peripheral circuits and a CRT according to a preferred embodiment of the present invention is shown having an ABL circuit 30. Conventional CRT peripheral circuits and components known to one skilled in the art are not described herein.

When a video signal having a high brightness is input to a cathode (not shown) of the CRT 10, beam current ib, flowing from a power supply voltage VCC to a ground voltage of a CRT driver 8 via the CRT 10, increases. Thus, the voltage across a resistor R1 increases, but the voltage at a node VA decreases.

However, if a video signal having a low brightness is input, the beam current ib decreases. As a result, the voltage across the resistor R1 decreases, and the voltage at the node VA increases. In other words, the amount of beam current ib is proportional to the brightness of a video signal applied to the cathode of the CRT 10 but inversely proportional to the voltage at the node VA.

The ABL circuit 30 according to an embodiment of the present invention includes an analog-digital converter (ADC) 32, a horizontal average circuit 34, an inverter 36, a vertical average circuit 38, a comparison circuit 40, and a gain control circuit 50. The ADC 32 converts an analog voltage signal of the node VA generated by the beam current ib into an N-bit digital signal (where N is a natural number) in response to a predetermined clock signal.

In most cases, a television receiver performs 15,752 horizontal scans per second and then refreshes thirty fields per second. In other words, the television needs to perform 525 horizontal scans per second to generate one field. However, in the case of interlaced scanning, a television refreshes sixty fields per second, so the television receiver needs to perform 262.5 horizontal scans per second to generate just one field.

The horizontal average circuit 34 outputs a horizontal average value which is based on the number of clock signals within the period of a horizontal synchronous signal Hsync (for example, 1/15,750 sec) to the inverter 36. In other words, N-bit digital signals included in a scanned line are added together within the period of the horizontal synchronous signal Hsync and then divided by the number of the clock signals included in the period of the horizontal synchronous signal Hsync.

The inverter 36 inverts the output of the horizontal average circuit 34 and outputs the results to the vertical average circuit 38 and the comparison circuit 40. In other words, a positive average value is inverted into a negative average value and vice versa, based on the N-bit medium value of the horizontal average circuit 34. Because the inverter 36 is used to make the beam current ib proportional to the output value of the horizontal average circuit 34, it is quite clear that the ABL circuit 30 can be realized without the inverter 36.

The vertical average circuit 38 outputs a vertical average value which is based on the number of horizontal synchronous signals Hsync within the period of a vertical synchronous signal Vsync (for example, 1/30 sec) to the comparison circuit 40. In other words, N-bit digital signals included in a scanned line are added together within the period of the vertical synchronous signal Vsync and then divided by the number of the horizontal synchronous signals Hsync included in the period of the vertical synchronous signal Vsync.

Therefore, an output signal Vave of the vertical average circuit 38 is an average value of digital signals in a predetermined frame or a predetermined field and indicates the amount of average beam current of a previous field. Thus, the output signal Vave of the vertical average circuit 38 indicates the brightness of the previous field.

The comparison circuit 40 compares the reference value REF with the output signal Vave of the vertical average circuit 38 or an output signal Have of the horizontal average circuit 34 inverted by the inverter 36 and outputs the compared value, a first comparison signal Main and a second comparison signal Sub to the gain control circuit 50. Because the reference value REF is variable, the amounts of beam current ib may be controlled by varying the reference value REF.

The gain control circuit 50 outputs the gain control signal Gout for controlling the brightness/contrast control circuit 2 in response to the first comparison signal Main and the second comparison signal Sub of the comparison circuit 40. Then, the brightness/contrast control circuit 2 controls the brightness and contrast of the video input signal IN in response to the control signal Gout.

Figure 3:
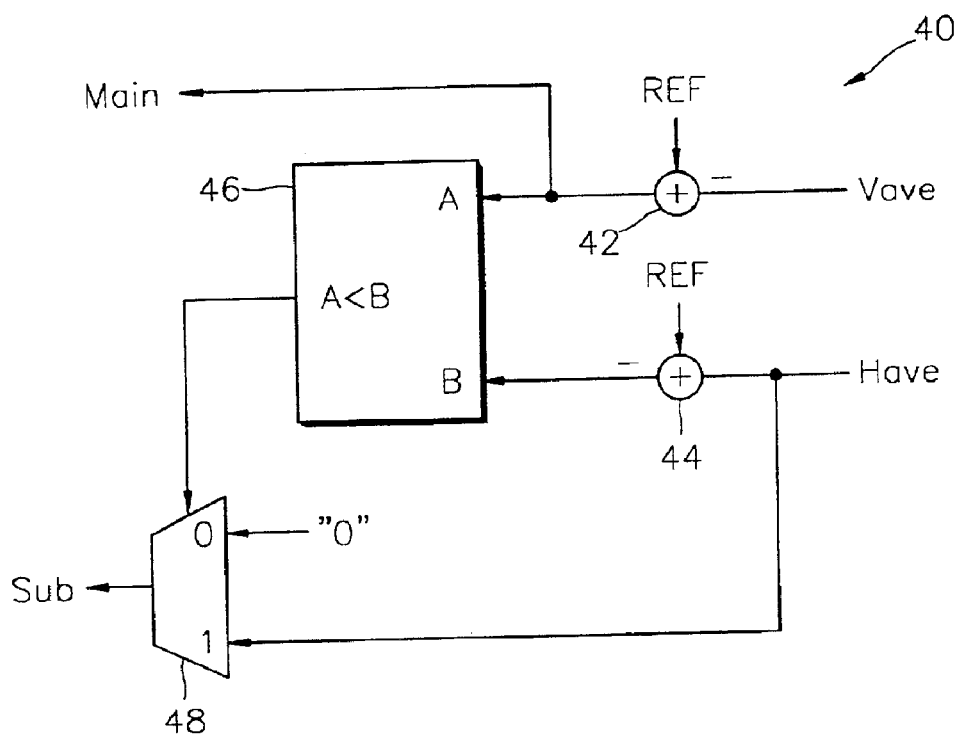
FIG. 3 is a block diagram of a comparison circuit of the ABL circuit shown in FIG. 2.

FIG. 3 is a block diagram of the comparison circuit 40 of the ABL circuit 30 shown in FIG. 2. Referring to FIG. 3, the comparison circuit 40 includes a first calculator 42, a second calculator 44, a comparator 46, and a multiplexer 48.

The first calculator 42 outputs a signal A, which is calculated by subtracting the output signal Vave of the vertical average circuit 38 from the reference value REF, to the comparator 46 and outputs a signal A as a first comparison signal Main to the gain control circuit 50. If the beam current ib is greater than the reference value REF, that is, if the output signal Vave of the vertical average circuit 38 is greater than the reference value REF, the value of the signal A is a negative number. As the output signal A of the first calculator 42 increases to a higher positive value, the brightness of the previous field becomes lower, the amount of beam current ib becomes smaller, and thus the previous field becomes darker.

The second calculator 44 outputs a signal B, which is calculated by subtracting the reference value REF from the output signal Have of the horizontal average circuit 34 and has been inverted by the inverter 36, to the comparator 46. If the beam current ib is high, the output signal Vave of the vertical average circuit 38 is also high, and thus the signal B has a positive value. As the output signal B of the second calculator 44 increases to a higher positive value, the beam current ib in the previous horizontal scanned line becomes greater, and the previous horizontal scanned line becomes brighter.

The comparator 46 compares the output signal A of the first calculator 42 and the output signal B of the second calculator 44, and outputs the comparison result to the multiplexer 48. The comparator 46 satisfies a comparison condition when the output signal B of the second calculator 44 is greater than the output signal A of the first calculator 42.

The multiplexer 48 outputs Sub (0 or Have) in response to the output signal of the comparator 46. For example, when the output signal B of the second calculator 44 is greater than the output signal A of the first calculator 42, the multiplexer 48 outputs Have to the gain control circuit 50. In the other cases, the multiplexer 48 outputs zero (0) to the gain control circuit 50.

Figure 4:
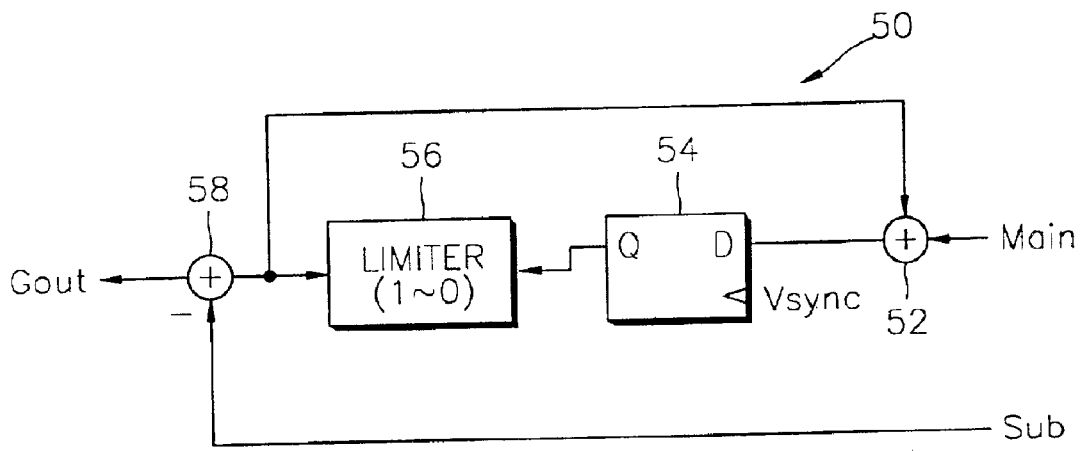
FIG. 4 is a block diagram of a gain control circuit of the ABL circuit shown in FIG. 2.

FIG. 4 is a block diagram of the gain control circuit 50 of the ABL circuit 30 shown in FIG. 2. Referring to FIG. 4, the gain control circuit 50 of the ABL circuit 30 includes a third calculator 52, a latch 54, a limiter 56, and a fourth calculator 58.

The third calculator 52 may be an adder for adding the first comparison signal Main of the gain control circuit 50 and the output signal of the limiter 56 fed back to the third calculator 52.

The latch 54 latches the output signal of the third calculation signal 52 in response to the vertical synchronous signal Vsync and outputs the result to the limiter 56. The latch 54 may be realized as a D flip-flop. However, it will be understood by those skilled in the art that various changes in the structure of the latch 54 can be made.

The limiter 56 limits the N-bit digital signal output from the latch 54 to within predetermined range (for example, when N is 8, the predetermined range is from 0 to 255) and outputs the limited value to the fourth calculator 58. When the output signal B of the second calculator 44 is greater than the output signal A of the first calculator 42, the fourth calculator 58 outputs a gain control signal Gout, which is calculated by subtracting the second comparison signal Sub from the output signal of the limiter 56.

However, when the output signal A of the first calculator 42 is greater than the output signal B of the second calculator 44, the fourth calculator 58 outputs the output signal of the limiter 56, as the gain control signal Gout, to the brightness/contrast control circuit 2.

The gain control signal Gout cannot exceed the maximum/minimum gain values controlled by the brightness/contrast control circuit 2, i.e, the gain control signal cannot increase the maximum brightness/contrast levels. Thus, the maximum/minimum gain values controlled by the brightness/contrast control circuit 2 for controlling the brightness and contrast of the input signal IN are between 0 and 1.

Figure 5:
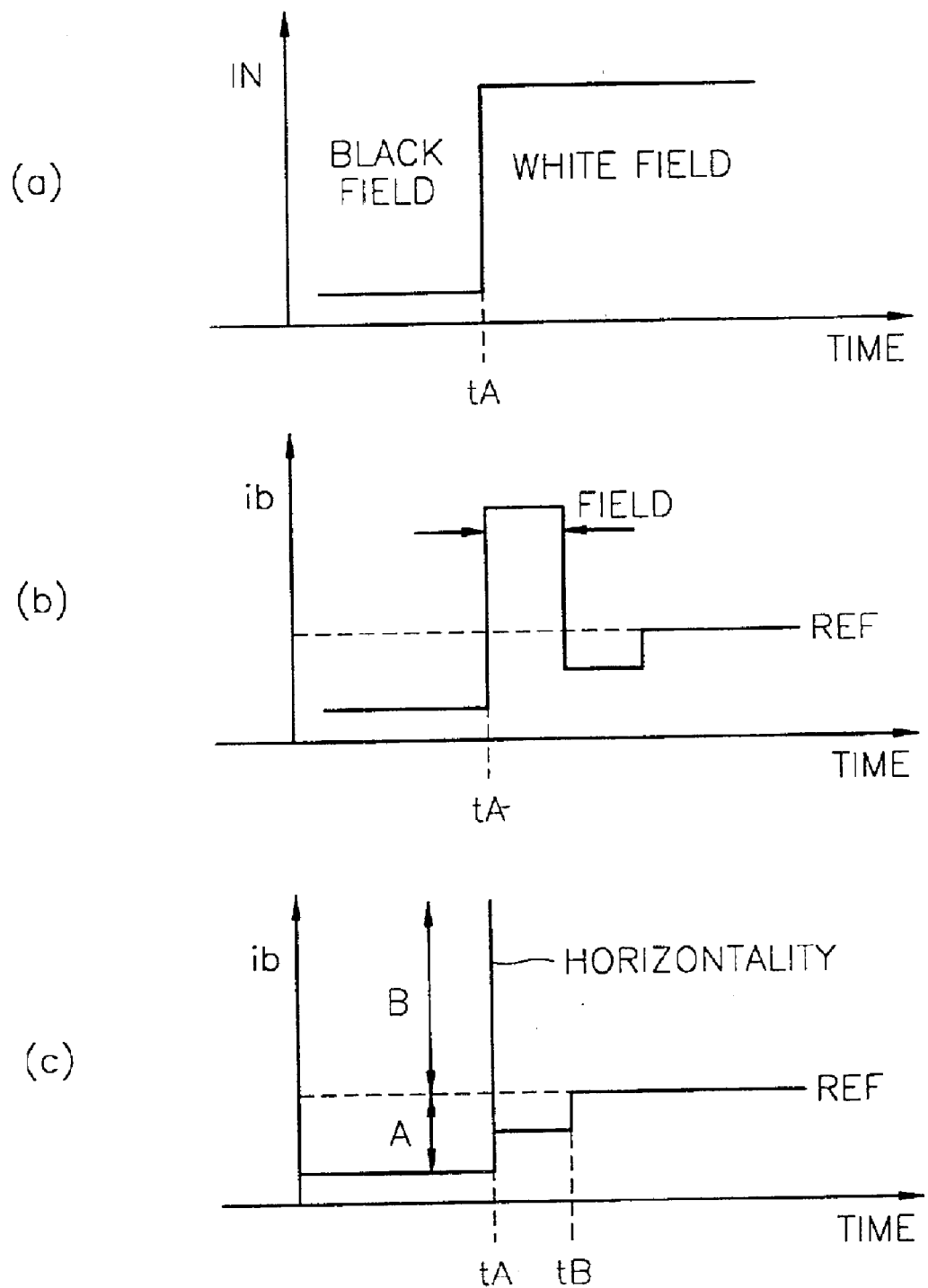
FIG. 5 is a graph showing the characteristics of the conventional ABL circuit and the ABL circuit according to a preferred embodiment of the present invention.

FIG. 5 is a graph showing the response of the conventional ABL circuit 20 and the ABL circuit 30 according to the embodiment of the present invention. FIG. 5(a) shows that the input signal IN changes from a black field to a white field at a time tA. FIG. 5(b) shows the response of the beam current ib in using the conventional ABL circuit 20. Referring to FIG. 5(b), in averaging the amount of beam current ib for every field, a large amount of beam current ib flows in one field and thus has a bad effect on the CRT 10, the FBT 12, and the CRT driver 8. FIG. 5(c) shows the beam current ib in using the ABL circuit 30 according to the embodiment of the present invention.

Referring to FIGS. 2, 3, 4, and 5(c) again, when an input signal has a lower brightness than the reference value REF, the beam current ib flowing into the cathode of the CRT 10 decreases. In addition, the output signal A of the first calculator 42 has a positive value, and the output value B of the second calculator 44 has a negative value.

As a result, the comparison conditions of the comparator 46 are not satisfied, and the multiplexer 48 outputs 0 as the second comparison signal Sub of the gain control circuit 50. The gain control circuit 50 outputs the output signal of the limiter 56 as the gain control signal Gout to the brightness/contrast control circuit 2 and displays the input signal IN on the CRT 10 without adjusting the brightness/contrast of the input signal IN.

However, as shown in FIG. 5(a), when the input signal IN having a higher brightness than the reference value REF is abruptly input at the time tA, the beam current ib increases rapidly in the same way as the case shown in FIG. 5(c).

As a result, the output signal A of the first calculator 42 has a positive value, and the value of the output signal B of the second calculator 55 rapidly changes from a negative one to a positive one. Therefore, the comparison condition of the comparator 46 is satisfied, and thus the multiplexer 48 outputs the output signal Have of the horizontal average circuit 34, inverted by the inverter 36, as the second comparison signal Sub of the gain control circuit 50. The fourth calculator 58 outputs the gain control signal Gout calculated by subtracting the second comparison signal Sub from the output signal of the limiter 56 to the brightness/contrast control circuit 2. Accordingly, the fourth calculator 58 reduces the brightness and contrast of the input signal IN to within predetermined levels. Therefore, a considerable amount of beam current ib cannot flow through the CRT 10 in one field.

In FIG. 5(c), after a time tB, the ABL circuit 30 is fully operated, and the beam current ib has the same value as the reference value REF.

Therefore, when the brightness of the video signal IN input to the CRT 10 increases rapidly, an ABL circuit 30 according to the present invention prevents a considerable amount of the beam current ib from flowing through the CRT 10 for any lengthy time period, thereby alleviating a spiked current on the CRT 10 and the CRT driver 8 and reducing noise generated from the FBT 12. Advantageously, the ABL circuit according to the present invention can efficiently prevent the rapid increase of beam current when the brightness of an video signal increases rapidly.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An automatic beam limiter circuit for controlling a brightness/contrast of a video signal input to a cathode-ray tube (CRT) comprising:

a conversion circuit for converting an analog signal to a digital signal, wherein the analog signal is generated from the video signal;

a horizontal average circuit for calculating a horizontal average of at least a portion of the digital signal;

a vertical average circuit for calculating a vertical average of the horizontal average;

a comparison circuit for comparing a first calculation value calculated between a reference value and the vertical average with a second calculation value calculated between the reference value and the horizontal average, and outputting a first comparison signal and a second comparison signal based on the comparison results; and a gain control circuit for producing a gain control signal in response to the first comparison and second comparison signals for adjusting the brightness/contrast of the video signal input to the CRT.

2. The automatic beam limiter circuit of claim 1, further comprises an inversion circuit for inverting the horizontal average of the horizontal average circuit.

3. The automatic beam limiter circuit of claim 1, wherein the comparison circuit comprises:

a first calculator for calculating the first calculation value by subtracting the vertical average from the reference value;

a second calculator for calculating the second calculation value by subtracting the reference value from the horizontal average;

a comparator for comparing the first calculation value and the second calculation value; and a multiplexer for outputting the horizontal average as the second comparison signal when the second calculation value is larger than the first calculation value, and outputting zero (0) as the second comparison signal when the second calculation is smaller than the first calculation value.

4. The automatic beam limiter circuit of claim 1, wherein the portion of the digital signal is a scanned line of the digital signal on the CRT.

5. The automatic beam limiter circuit of claim 1, wherein the first comparison signal is the first calculation value.

6. The automatic beam limiter circuit of claim 1, wherein the gain control circuit comprises:

a third calculator for adding the first comparison signal to a feedback limited signal;

a latch for latching the output of the third calculator;

a limiter for limiting the output signal of the latch within a predetermined range and feeding back the limited signal to the third calculator; and a fourth calculator for subtracting the second comparison signal from the limited signal to produce the control gain signal.

7. A television receiver including an automatic beam limiter circuit for controlling a brightness/contrast of a video signal input to a cathode ray tube (CRT), wherein the automatic beam limiter circuit comprising:

a conversion circuit for converting an analog signal to a digital signal, wherein the analog signal is generated from the video signal;

an average calculator for calculating a horizontal average and a vertical average of the digital signal at least a portion of the digital signal;

a comparison circuit for comparing a first calculation value calculated between a reference value and the vertical average with a second calculation value calculated between the reference value and the horizontal average, and outputting a first comparison signal and a second comparison signal, wherein the first comparison signal is the first calculated value, and the second comparison signal is zero (0) or the second calculated value according to the comparison results; and a gain control circuit for producing a gain control signal in response to the first comparison and second comparison signals for adjusting the brightness/contrast of the video signal input to the CRT.

8. The television receiver of claim 7, wherein the second comparison signal is the second calculated value when the first calculated value is smaller than the second calculated value, and the second comparison signal is zero (0) when the first calculated value is larger than the second calculated value.

9. The television receiver of claim 7, wherein the first calculation value is calculated by subtracting the vertical average from the reference value, the second calculation value is calculated by subtracting the reference value from the horizontal average.

10. The television receiver of claim 7, wherein the portion of the digital signal is a scanned line of the digital signal on the CRT.

* * * * *